United States Patent
Suzuki (10) Patent No.: US 10,295,366 B2
(45) Date of Patent: May 21, 2019

(54) SENSOR ERROR CORRECTING APPARATUS AND METHOD

(71) Applicant: Toyota Jidosha Kabushiki Kaisha, Toyota-shi Aichi-ken (JP)

(72) Inventor: Noriyoshi Suzuki, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/812,487

(22) Filed: Nov. 14, 2017

(65) Prior Publication Data

US 2018/0202833 A1    Jul. 19, 2018

(30) Foreign Application Priority Data

Jan. 13, 2017    (JP) .................................. 2017-004474

(51) Int. Cl.

| | |
|---|---|
| G01M 17/00 | (2006.01) |
| G06F 7/00 | (2006.01) |
| G06F 19/00 | (2018.01) |
| G01C 25/00 | (2006.01) |
| G01C 23/00 | (2006.01) |
| G01C 21/12 | (2006.01) |
| G01P 15/00 | (2006.01) |
| G01P 3/00 | (2006.01) |
| G01P 21/00 | (2006.01) |
| G01C 21/16 | (2006.01) |
| G06F 7/70 | (2006.01) |
| G06G 7/00 | (2006.01) |
| G06G 7/76 | (2006.01) |
| H04B 1/00 | (2006.01) |

(52) U.S. Cl.
CPC ............. *G01C 25/00* (2013.01); *G01C 21/12* (2013.01); *G01C 21/165* (2013.01); *G01C 23/00* (2013.01); *G01C 25/005* (2013.01); *G01P 3/00* (2013.01); *G01P 15/00* (2013.01); *G01P 21/00* (2013.01)

(58) Field of Classification Search
CPC ........ G01C 25/00; G01C 21/12; G01C 23/00; G01P 15/00; G01P 21/00; G06F 19/00; H04B 1/707
USPC .................................. 701/30.5, 70; 375/141
See application file for complete search history.

(56) References Cited

U.S. PATENT DOCUMENTS

| | | |
|---|---|---|
| 8,421,670 B2 | 4/2013 | Kojima et al. |
| 9,630,672 B2 | 4/2017 | Inoue et al. |

(Continued)

FOREIGN PATENT DOCUMENTS

| | | |
|---|---|---|
| JP | 5029442 B2 | 9/2012 |
| JP | 5393432 B2 | 1/2014 |
| JP | 5673071 B2 | 2/2015 |

*Primary Examiner* — Mahmoud S Ismail
(74) *Attorney, Agent, or Firm* — Dinsmore & Shohl LLP (57) ABSTRACT

A sensor error correcting apparatus is provided with: a roll angle estimator configured to estimate a roll angle on the basis of a yaw rate of a moving body, a wheel speed, and lateral acceleration; a converter configured to convert the yaw rate to a horizontal yaw rate, on the basis of an estimated roll angle; and a zero point corrector configured to compare an azimuth change amount obtained by integrating the horizontal yaw rate in a turning period, which is from a start of turning of the moving body to an end of the turning, with an azimuth change amount of the velocity vector in the turning period, and configured to correct the measured lateral acceleration.

7 Claims, 4 Drawing Sheets

(56) References Cited

U.S. PATENT DOCUMENTS

2011/0235686 A1\* 9/2011 Kojima ................ G01S 19/426
    375/141
2012/0259526 A1\* 10/2012 Inoue ................... B60W 40/112
    701/70

\* cited by examiner

In right turn

FIG. 2B

In left turn

SENSOR ERROR CORRECTING APPARATUS AND METHOD

CROSS-REFERENCE TO RELATED APPLICATIONS

This application is based upon and claims the benefit of priority of the prior Japanese Patent Application No. 2017-004474, filed on Jan. 13, 2017, the entire contents of which are incorporated herein by reference.

BACKGROUND

1. Technical Field

Embodiments of the present disclosure relate to a sensor error correcting apparatus and a sensor error correcting method, and particularly relate to a sensor error correcting apparatus and a sensor error correcting method in which an error in a sensor mounted on a moving body is corrected.

2. Description of the Related Art

For this type of apparatus, for example, there is proposed an apparatus that is configured to calculate a path or trajectory of a host vehicle or a host vehicle by integrating, for a predetermined time, a velocity vector of the host vehicle obtained on the basis of a global positioning system (GPS) signal transmitted from each of a plurality of GPS satellites, and that is configured to move the path of the host vehicle in parallel, i.e. to correct the path, on the basis of a difference between GPS pseudo distance data, which is obtained from the GPS signal in each epoch on the path of the host vehicle, and a distance between the host vehicle and each of the GPS satellites (refer to Japanese Patent No. 06678071).

There is proposed an apparatus that is configured to estimate pitch angular velocity on the basis of an estimated value of a longitudinal vehicle body speed, an estimated value of a lateral vehicle body speed, a detected value of vertical acceleration, a detected value of roll angular velocity, a previous estimated value of a roll angle, and a previous estimated value of a pitch angle, and that is configured to estimate the roll angle and the pitch angle from the estimated pitch angular velocity by using an observer in which features specific to vehicle motion are added to a constraint condition (refer to Japanese Patent No. 05029442). There is also proposed an apparatus configured to estimate a roll angle, a vehicle speed, a roll angular velocity sensor offset, a yaw angular velocity offset, and a vertical acceleration sensor offset, on the basis of a detected value of vertical acceleration, a detected value of longitudinal acceleration, a detected value of lateral acceleration, and a detected value of a rear wheel speed sensor, and on the basis of respective previous estimated values of the roll angle, the vehicle speed, the roll angular velocity sensor offset, the yaw angular velocity sensor offset, and the vertical acceleration sensor offset, by using a Kalman filter under a motion condition specific to motorcycles (refer to Japanese Patent No. 05393432).

A technology/technique described in Japanese Patent No. 05673071 does not take into account a roll angle of the vehicle. That is why, in the technology/technique described in Japanese Patent No. 05673071, a direction or azimuth associated with the path of the vehicle (i.e. a moving direction or azimuth of the vehicle) obtained when the vehicle runs on a road with a cant or a bank is deviated from an actual direction or azimuth. Here, the roll angle can be estimated from lateral acceleration of the vehicle. It is, however, hard to correct an error in a lateral acceleration sensor configured to measure the lateral acceleration, and it is hard to improve roll angle estimation accuracy, which are technically problematic.

SUMMARY

In view of the aforementioned problems, it is therefore an object of embodiments of the present disclosure to provide a sensor error correcting apparatus and a sensor error correcting method in which an error in a lateral acceleration sensor can be appropriately corrected.

The above object of embodiments of the present disclosure can be achieved by a first sensor error correcting apparatus is provided with: a yaw rate gyro configured to measure a yaw rate of a moving body; a wheel speed sensor configured to measure a wheel speed of the moving body; a lateral acceleration sensor configured to measure lateral acceleration of the moving body; an acquirer configured to obtain (i) information about a position of each of information transmission sources, (ii) information about a distance between each of the information transmission sources and the moving body, and (iii) transmission source information including information about a relative speed of the moving body to each of the information transmission sources, on the basis of a signal transmitted from each of the information transmission sources; a velocity estimator configured to estimate a velocity vector of the moving body on the basis of the obtained transmission source information; a roll angle estimator configured to estimate a roll angle of the moving body on the basis of the measured yaw rate, the measured wheel speed, and the measured lateral acceleration; a converter configured to convert the measured yaw rate to a horizontal yaw rate, on the basis of the estimated roll angle; and a corrector configured to compare an azimuth change amount obtained by integrating the horizontal yaw rate in a turning period, which is from a start of turning of the moving body to an end of the turning, with an azimuth change amount of the velocity vector in the turning period, and configured to correct the measured lateral acceleration.

In correcting an error in the lateral acceleration sensor, firstly, it is necessary to clarify whether or not there is an error in the lateral acceleration sensor. Thus, on the sensor error correcting apparatus, (i) the azimuth change amount of the velocity vector based on the transmission source information and (ii) the azimuth change amount obtained by integrating the horizontal yaw rate, which is converted from the yaw rate on the basis of the roll angle estimated from respective measurement results of the yaw rate gyro, the wheel speed sensor, and the lateral acceleration sensor, are compared in the turning period of the moving body.

When the moving body goes straight, even if there is an error in the lateral acceleration sensor, the error hardly influences the azimuth change amount obtained by integrating the horizontal yaw rate. On the other hand, if there is an error in the lateral acceleration sensor when the moving body turns, the error remarkably influences the azimuth change amount obtained by integrating the horizontal yaw rate. Therefore, the azimuth change amount of the velocity vector and the azimuth change amount obtained by integrating the horizontal yaw rate are compared in the turning period of the moving body.

If there is an error in the lateral acceleration sensor, that may also cause an error in the roll angle estimated on the basis of the measurement result of the lateral acceleration sensor or the like. This results in a deviation between the azimuth change amount of the velocity vector and the azimuth change amount obtained by integrating the horizontal yaw rate. Errors in the yaw rate and the wheel speed can be more accurately corrected by existing techniques/technologies, and it can be thus considered that there is no influence of the errors in the yaw rate and the wheel speed.

If there is an error in the lateral acceleration sensor, to what extent the measurement result of the lateral acceleration sensor, i.e. the lateral acceleration, is corrected is determined on the basis of a deviation amount between the azimuth change amount of the velocity vector and the azimuth change amount obtained by integrating the horizontal yaw rate. In other words, if the deviation amount is relatively large, the lateral acceleration is corrected to a relatively large extent, and if the deviation amount is relatively small, the lateral acceleration is corrected to a relatively small extent. Therefore, according to the sensor error correcting apparatus, it is possible to appropriately correct the error in the lateral acceleration sensor.

In one aspect of the first position calculating apparatus according to embodiments of the present disclosure, the corrector is configured to compare an azimuth change amount obtained by integrating the horizontal yaw rate in a plurality of turning periods, with an azimuth change amount of the velocity vector in the plurality of turning periods, and configured to correct the measured lateral acceleration. According to this aspect, the azimuth change amount obtained by integrating the horizontal yaw rate in the plurality of turning periods is compared with the azimuth change amount of the velocity vector in the plurality of turning periods. It is thus possible to suppress, for example, an influence of noise on the correction of the lateral acceleration.

The above object of embodiments of the present disclosure can be achieved by a sensor error correcting method in a sensor error correcting apparatus including: a yaw rate gyro configured to measure a yaw rate of a moving body; a wheel speed sensor configured to measure a wheel speed of the moving body; a lateral acceleration sensor configured to measure lateral acceleration of the moving body; and an acquirer configured to obtain (i) information about a position of each of information transmission sources, (ii) information about a distance between each of the information transmission sources and the moving body, and (iii) transmission source information including information about a relative speed of the moving body to each of the information transmission sources, on the basis of a signal transmitted from each of the information transmission sources, said sensor error correcting method is provided with: estimating a velocity vector of the moving body on the basis of the obtained transmission source information; estimating a roll angle of the moving body on the basis of the measured yaw rate, the measured wheel speed, and the measured lateral acceleration; converting the measured yaw rate to a horizontal yaw rate, on the basis of the estimated roll angle; and comparing an azimuth change amount obtained by integrating the horizontal yaw rate in a turning period, which is from a start of turning of the moving body to an end of the turning, with an azimuth change amount of the velocity vector in the turning period, and correcting the measured lateral acceleration.

According to the error correcting method in embodiments of the present disclosure, it is possible to appropriately correct the error in the lateral acceleration sensor, as in the first sensor error correcting apparatus according to embodiments of the present disclosure. Even the error correcting method in embodiments of the present disclosure can adopt the same various aspects as those of the first sensor error correcting apparatus according to embodiments of the present disclosure.

The above object of embodiments of the present disclosure can be achieved by a second sensor error correcting apparatus is provided with: a velocity estimator configured to estimate a velocity vector of a moving body on the basis of (i) information about a position of each of information transmission sources, (ii) information about a distance between each of the information transmission sources and the moving body, and (iii) transmission source information including information about a relative speed of the moving body to each of the information transmission sources, which are obtained from a signal transmitted from each of the information transmission sources; a roll angle estimator configured to estimate a roll angle of the moving body on the basis of a yaw rate of the moving body, a wheel speed of the moving body, and lateral acceleration of the moving body; a converter configured to convert the yaw rate to a horizontal yaw rate, on the basis of the estimated roll angle; and a corrector configured to compare an azimuth change amount obtained by integrating the horizontal yaw rate in a turning period, which is from a start of turning of the moving body to an end of the turning, with an azimuth change amount of the velocity vector in the turning period, and configured to correct the measured lateral acceleration.

According to the second error correcting apparatus in embodiments of the present disclosure, it is possible to appropriately correct the error in the lateral acceleration sensor, as in the first sensor error correcting apparatus according to embodiments of the present disclosure. Even the second error correcting apparatus in embodiments of the present disclosure can adopt the same various aspects as those of the first sensor error correcting apparatus according to embodiments of the present disclosure.

The nature, utility, and further features of this disclosure will be more clearly apparent from the following detailed description with reference to embodiments of the disclosure when reed in conjunction with the accompanying drawings briefly described below.

DETAILED DESCRIPTION OF THE EMBODIMENTS

A sensor error correcting apparatus according to an embodiment of the present disclosure will be explained with reference to FIG. 1 to FIG. 4. The embodiment below exemplifies a sensor error correcting apparatus applied to a posture estimation technique/technology for estimating a vehicle posture.

(Configuration of Apparatus)

Figure 1:
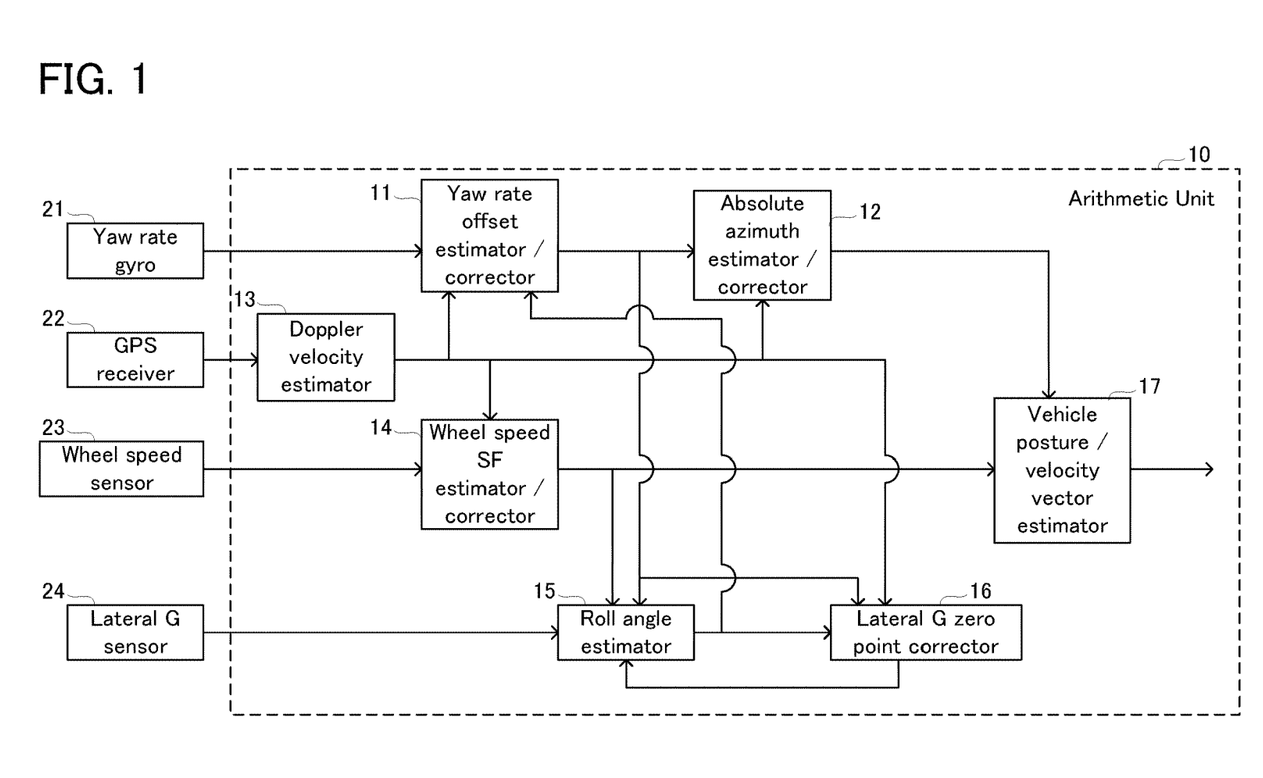
FIG. 1 is a block diagram illustrating a configuration of a sensor error correcting apparatus according to an embodiment.
Figure 2A:
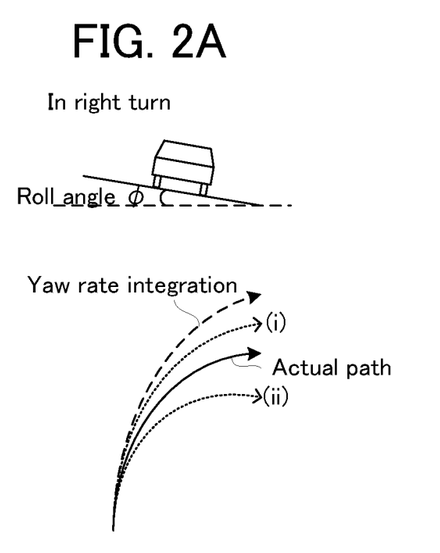
FIG. 2A is a diagram illustrating one example of an azimuth change and an influence of a roll angle when a vehicle turns right.
Figure 2B:
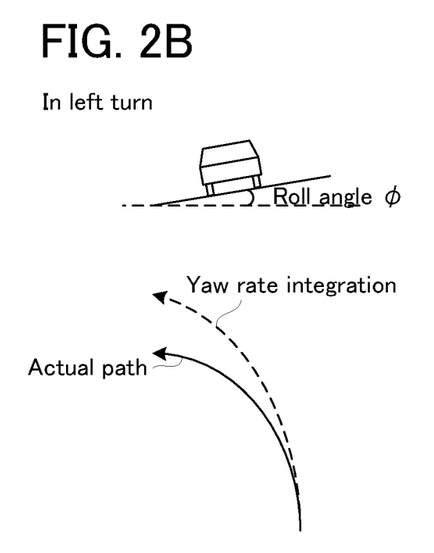
FIG. 2B is a diagram illustrating one example of an azimuth change and an influence of a roll angle when a vehicle turns left.

A configuration of the sensor error correcting apparatus according to the embodiment will be explained with reference to FIG. 1. FIG. 1 is a block diagram illustrating the configuration of the sensor error correcting apparatus according to the embodiment.

A sensor error correcting apparatus 1 is mounted on a not-illustrated vehicle, which is one example of the "moving body" according to embodiments of the present disclosure. In FIG. 1, the sensor error correcting apparatus 1 is provided with an arithmetic unit 10, a yaw rate gyro 21, a GPS receiver 22, a wheel speed sensor 23, and a lateral acceleration sensor 24. The yaw rate gyro 21, the GPS receiver 22 the wheel speed sensor 23, and the lateral acceleration sensor 24 may not be provided solely for the sensor error correcting apparatus 1, but may be shared among other apparatuses mounted on the vehicle.

The arithmetic unit 10 includes a yaw rate offset estimator/corrector 11, an absolute azimuth estimator/corrector 12, a Doppler velocity estimator 18, a wheel speed scale factor estimator/corrector 14, a roll angle estimator 15, a lateral acceleration zero point corrector 16, and a vehicle posture/velocity vector estimator 17, as processing blocks logically realised therein or processing circuits physical realized therein.

(Operation of Apparatus)

Next, operation of the sensor error correcting apparatus 1 as configured above will be explained.

1. Calculation of Velocity Vector

The GPS receiver 22 is configured to receive a radio wave from a GPS satellite. The GPS receiver 22 is configured to obtain, as information about the GPS satellite (hereinafter referred to as "satellite information" as occasion demands), a satellite number of the GPS satellite, information about an orbit of the GPS satellite (or ephemeris), a time point at which the GPS satellite transmits the radio wave, and intensity or a frequency etc. of a received signal, from the received radio wave, i.e. a GPS signal. The GPS receiver 22 is configured to obtain the satellite information for all GPS satellites from which the GPS receiver 22 receives radio waves. The GPS receiver 22 is configured to output the obtained satellite information to the Doppler velocity estimator 18 of the arithmetic unit 10.

The Doppler velocity estimator 18 is configured to calculate a velocity vector of a host vehicle, i.e. the vehicle on which the sensor error correcting apparatus 1 is mounted, on the basis of the satellite information about each of the GPS satellites.

Specifically, GPS pseudo distance data is calculated on the basis of the time point at which the GPS satellite transmits the radio wave and a time point at which the host vehicle, i.e. the GPS receiver 22, receives the radio wave. A Doppler frequency of the received signal from the GPS satellite is calculated on the basis of a frequency of the received signal of the GPS satellite and a known frequency of a signal transmitted from the GPS satellite. Position coordinates of the GPS satellite are calculated on the basis of the information about the orbit of the GPS satellite and the time point at which the GPS satellite transmits the radio wave. A relative speed of the host vehicle to the GPS satellite is calculated on the basis of the Doppler frequency of the GPS satellite. A velocity vector of the GPS satellite is calculated on the basis of time-series data of the position coordinates of the GPS satellite. A position of the host vehicle is calculated on the basis of the GPS pseudo distance data. A direction of the GPS satellite is calculated on the basis of the calculated position of the host vehicle and the position coordinates of the GPS satellite.

Those processes are performed on each of the GPS satellites before a speed of the host vehicle in a direction of each GPS satellite (i.e. on a straight line connecting the host vehicle and each GPS satellite) is calculated on the basis of the relative speed of the host vehicle to each GPS satellite, the velocity vector of each GPS satellite, and the direction of each GPS satellite. The vector velocity of the host vehicle is calculated on the basis of the calculated speed of the host vehicle. Existing techniques/technologies can be applied to a method of calculating the velocity vector of the host vehicle. An explanation of the details of the method will be thus omitted.

2. Estimation of Roll Angle

The yaw rate offset estimator/corrector 11 is configured to estimate a yaw rate generated in the host vehicle, on the basis of an output signal from the yaw rate gyro 21, and is configured to estimate an offset of the yaw rate on the basis of the velocity vector estimated by the Doppler velocity estimator 13. The yew rate offset estimator/corrector 11 is configured to correct the estimated yaw rate on the basis of the estimated offset. Existing techniques/technologies can be applied to a method of correcting the yaw rate. An explanation of the details of the method will be thus omitted.

The wheel speed scale factor estimator/corrector 14 is configured to estimate a wheel speed on the basis of an output signal from the wheel speed sensor 23, and is configured to estimate a scale factor of the wheel speed on the basis of the velocity vector estimated by the Doppler velocity estimator 13. The wheel speed scale factor estimator/corrector 14 is configured to correct the estimated wheel speed on the basis of the estimated scale factor. Existing techniques/technologies can be applied to a method of correcting the wheel speed. An explanation of the details of the method will be thus omitted.

The roll angle estimator 16 is configured to estimate a roll angle of the host vehicle on the basis of an output signal from the lateral acceleration sensor 24, the yaw rate corrected by the yaw rate offset estimator/corrector 11, and the wheel speed corrected by the wheel speed scale factor estimator/corrector 14. Here, if the roll angle is "φ", the yaw rate is "R", the wheel speed is "V", lateral acceleration is "Gy", and gravity acceleration is "g", then the roll angle "φ" is given by "g sin φ=Gy−RV".

3. Correction of Zero Point of Lateral Acceleration

The roll angle may be estimated on the basis of the yaw rate, the wheel speed, and the lateral acceleration. Regarding the yaw rate and the wheel speed, as described above, the corrected yaw rate and the corrected wheel speed are used to estimate the roll angle. The lateral acceleration, however, may be obtained directly from the output signal from the lateral acceleration sensor 24, as illustrated in FIG. 1. If there is an error in the lateral acceleration sensor 24, the estimated roll angle may include an error caused by the error in the lateral acceleration sensor 24.

The lateral acceleration zero point corrector 16 is configured to firstly detect whether or not the estimated roll angle includes the error caused by the lateral acceleration sensor 24, in the following manner. If the roll angle includes an error, a path or trajectory of the host vehicle (refer to dashed lines, "Yaw rate integration", in FIG. 2A and FIG. 2B) obtained by integrating a yaw rate converted or projected on a horizontal plane in view of the roll angle (hereinafter referred to as a "horizontal yaw rate" as occasion demands)

is deviated from a path (refer to solid lines, "Actual path", in FIG. 2A and FIG. 2B) based on the velocity vector of the host vehicle obtained on the basis of a satellite signal. Thus, an azimuth change amount obtained by integrating the horizontal yaw rate is compared with an azimuth change amount of the velocity vector, by which it is detected whether or not the roll angle includes an error.

If the roll angle includes an error, the lateral acceleration zero point corrector 16 is configured to correct a zero point of the lateral acceleration sensor 24 on the basis of a deviation amount between the azimuth change amount obtained by integrating the horizontal yaw rate and the azimuth change amount of the velocity vector. The "correction of the zero point" according to the embodiment includes, for example, such a concept that a correction value for increasing or decreasing a value of the lateral acceleration based on the output signal from the lateral acceleration sensor 24 is outputted from the lateral acceleration zero point corrector 16 to the roll angle estimator 15 and that the value of the lateral acceleration is corrected by using the correction value on the roll angle estimator 15. The correction of the zero point will be explained in detail later.

4. Estimation of Vehicle Posture

The yaw rate offset estimator/corrector 11 is configured to obtain the horizontal yaw rate on the basis of the corrected yaw rate and the roll angle estimated by the roll angle estimator 15, and is configured to output the obtained horizontal yaw rate to the absolute azimuth estimator/corrector 12.

The absolute azimuth estimator/corrector 12 is configured to estimate an absolute azimuth on a horizontal plane of the host vehicle on the basis of the horizontal yaw rate and the velocity vector estimated by the Doppler velocity estimator 13. The absolute azimuth estimator/corrector 12 is configured to correct an influence of a pitch angle on the absolute azimuth, on the basis of the velocity vector estimated by the Doppler velocity estimator 13. Existing techniques/technologies can be applied to a method of correcting the influence of the pitch angle on the absolute azimuth. An explanation of the details of the method will be thus omitted.

The vehicle posture/velocity vector estimator 17 is configured to estimate a vehicle posture/velocity vector of the host vehicle, i.e. an absolute azimuth and a vehicle speed of the host vehicle, on the basis of the absolute azimuth corrected by the absolute azimuth estimator/corrector 12 and the wheel speed corrected by the wheel speed scale factor estimator/corrector 14.

(Correction of Zero Point of Lateral Acceleration)

The correction of the zero point of the lateral acceleration sensor 24 will be additionally explained with reference to FIG. 2A to FIG. 4.

Here, it is exemplified that the host vehicle turns on a road with a cent. The vehicle rolls to a greater or lesser degree even when the vehicle turns on a road without a cant. A relation between a turning direction of the vehicle and the roll angle may be different from a relation illustrated in FIG. 2A and FIG. 2B. The following explanation can be thus applied to even when the vehicle turns on the road without the cant.

If the estimated roll angle includes an error, as described above, the path or trajectory of the host vehicle (refer to the dashed lines, "Yaw rate integration", in FIG. 2A and FIG. 2B) obtained by integrating the horizontal yaw rate is deviated from the path (refer to the solid lines, "Actual path", in FIG. 2A and FIG. 2B) based on the velocity vector of the host vehicle obtained on the basis of the satellite signal.

The yaw rate and the wheel speed used to estimate the roll angle are already corrected by the yaw rate offset estimator/corrector 11 and the wheel speed scale factor estimator/corrector 14. It can be thus said that the error in the roll angle is caused by the lateral acceleration based on the output signal from the lateral acceleration sensor 24. It has been found from a study by the present inventors that the yaw rate and the wheel speed can be accurately corrected even by existing techniques/technologies.

The correction of the zero point of the lateral acceleration sensor 24 may be performed on the basis of the deviation amount between the azimuth change amount obtained by integrating the horizontal yaw rate and the azimuth change amount of the velocity vector, as described above. The horizontal yaw rate is obtained from the output signals of the yaw rate gyro 21, the wheel speed sensor 28, and the lateral acceleration sensor 24. Thus, the azimuth change amount obtained by integrating the horizontal yaw rate will be referred to as a "DR azimuth change amount", as occasion demands, after dead reckoning (DR) using various in-vehicle sensors. On the other hand, the velocity vector is obtained from the satellite information about the GPS satellite. Thus, the azimuth change amount of the velocity vector will be referred to as a "GPS azimuth change amount", as occasion demands.

When the vehicle goes straight, a direction or azimuth of the vehicle hardly changes, and thus, in principle, the correction of the zero point may not be accurately performed. On the sensor error correcting apparatus 1, the DR azimuth change amount and the GPS azimuth change amount are obtained when the host vehicle turns.

Figure 3:
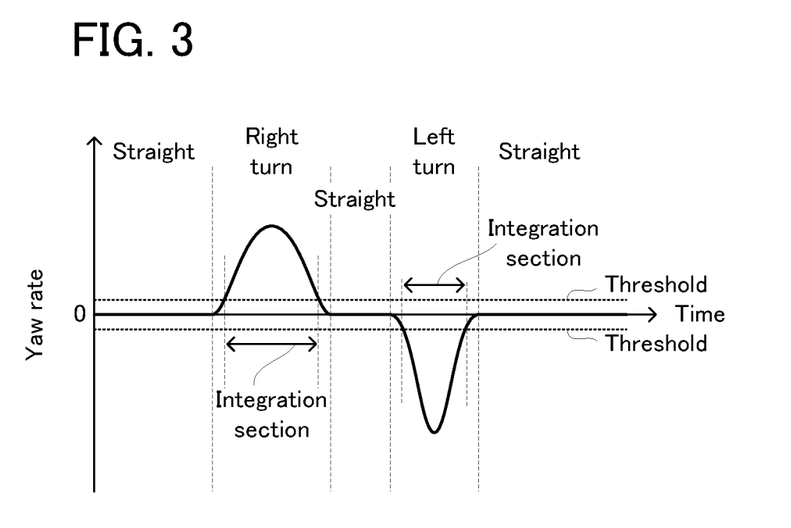
FIG. 3 is a diagram illustrating a concept of an integration section according to the embodiment.

Here, on the sensor error correcting apparatus 1, it is determined that the host vehicle turns if an absolute value of the yaw rate generated in the host vehicle is greater than a predetermined threshold value. Therefore, for example, as illustrated in FIG. 8, a period in which the horizontal yaw rate is integrated is a period in which the absolute value of the yaw rage generated in the host vehicle is greater than the predetermined threshold value (refer to dashed lines). The "predetermined threshold value" is set to a value slightly greater than "0", in view of e.g. an error in the yaw rate gyro 21, an influence of noise, etc.

An error correction process associated with the correction of the zero point of the lateral acceleration sensor 24 will be explained with reference to a flowchart in FIG. 4.

Figure 4:
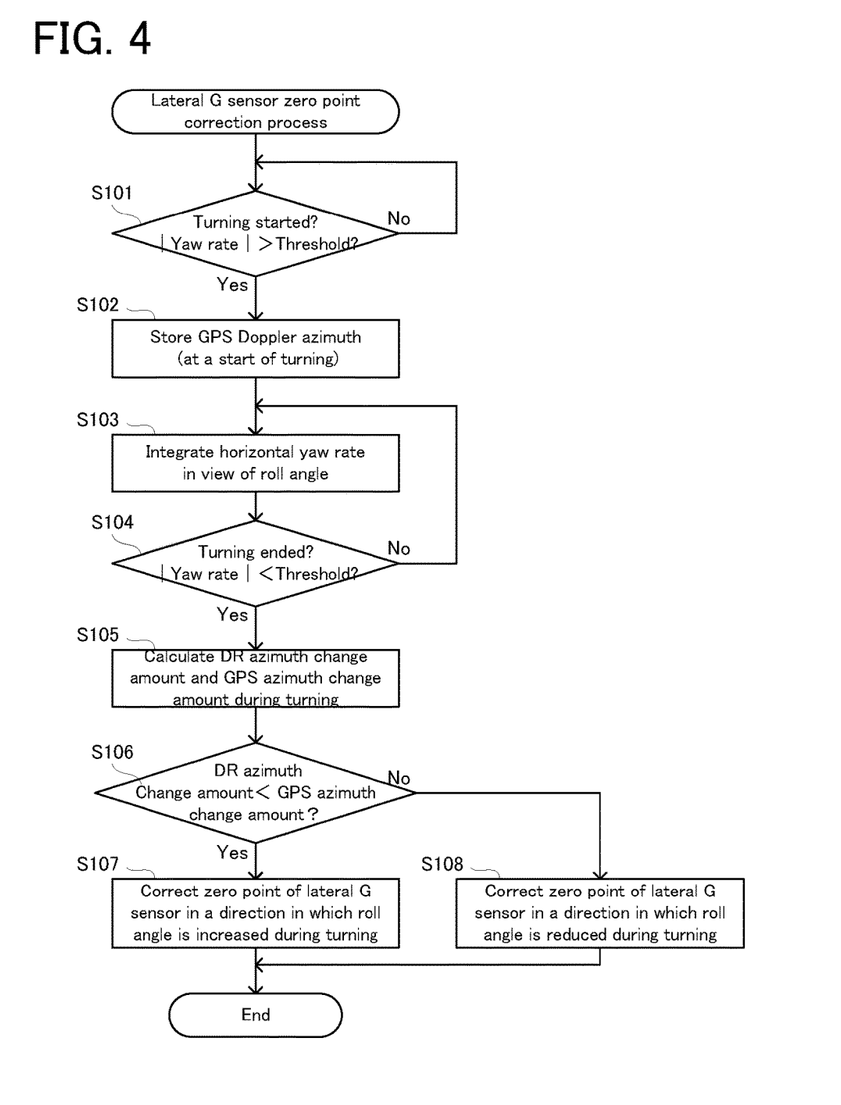
FIG. 4 is a flowchart illustrating an error correction process according to the embodiment.

In FIG. 4, the lateral acceleration zero point corrector 16 determines whether or not the yaw rate is greater than a threshold value on the basis of the yaw rate corrected by the yaw rate offset estimator/corrector 11 (step S101). In this determination, if it is determined that the yaw rate is less than the threshold value (the step S101: No), the lateral acceleration zero point corrector 16 performs the determination in the step S101 again; namely, the lateral acceleration zero point corrector 16 stands by until the yaw rate becomes greater than the threshold value.

On the other hand, in the determination in the step S101, if it is determined that the yaw rate is greater than the threshold value (the step S101: Yes), the lateral acceleration zero point corrector 16 stores an azimuth at a time point at which it is determined that the yaw rate is greater than the threshold value, i.e. at a time point at which the host vehicle starts turning, on the basis of the velocity vector estimated by the Doppler velocity estimator 18 (step S102).

In parallel with the step S102, the lateral acceleration zero point corrector 16 obtains the horizontal yaw rate on the basis of the yaw rate corrected by the yaw rate offset estimator/corrector 11 and the roll angle estimated by the roll angle estimator 15, and starts to integrate the horizontal yaw rate (step S103). If the yaw rate is "R" and the roll angle is "φ", then, the horizontal yaw rate is given by the following equation.

$$\hat{R} = R \frac{1}{\cos \varphi} \qquad \text{[Equation 1]}$$

The lateral acceleration zero point corrector 16 then determines whether or not the yaw rate is less than the threshold value on the basis of the yaw rate corrected by the yaw rate offset estimator/corrector 11 (step S104). In this determination, if it is determined that the yaw rate is greater than the threshold value (the step S104: No), the lateral acceleration zero point corrector 16 performs the step S103. The step 103 is repeated until it is determined that the yaw rate is lees than the threshold value, by which the horizontal yaw rate is integrated while the host vehicle turns, i.e. in a turning period of the host vehicle.

On the other hand, in the determination in the step S104, if it is determined that the yaw rate is less than the threshold value (the step S104: Yes), the lateral acceleration zero point corrector 16 stores an azimuth at a time point at which it is determined that the yaw rate is less than the threshold value, i.e. at a time point at which the host vehicle ends the turning, on the basis of the velocity vector estimated by the Doppler velocity estimator 18. The lateral acceleration zero point corrector 16 then compares the azimuth angle stored in the step S102 with the obtained azimuth angle, thereby obtaining the GPS azimuth change amount in the turning period of the host vehicle. The lateral acceleration zero point corrector 16 further obtains the DR azimuth change amount from the integrated horizontal yaw rate (step S105).

The lateral acceleration zero point corrector 16 then determines whether or not the DR azimuth change amount is less than the GPS azimuth change amount (step S106). If the DR azimuth change amount is less than the GPS azimuth change amount, the estimated roll angle is less than an actual roll angle. In this case, the path of the host vehicle obtained by integrating the horizontal yaw rate is deviated from the actual path to an outside of a curve, for example, as illustrated in a dotted line (i) in FIG. 2A. On the other hand, if the DR azimuth change amount is greater than the GPS azimuth change amount, the estimated roll angle is greater than the actual roll angle. In this case, the path of the host vehicle obtained by integrating the horizontal yaw rate is deviated from the actual path to an inside of the curve, for example, as illustrated in a dotted line (ii) in FIG. 2A.

In the determination in the step S106, if it is determined that the DR azimuth change amount is less than the GPS azimuth change amount (the step S106: Yes), the lateral acceleration zero point corrector 16 corrects the zero point of the lateral acceleration sensor 24 in accordance with a difference between the DR azimuth change amount and the GPS azimuth change amount, in a direction of increasing the estimated roll angle; namely, the lateral acceleration zero point corrector 16 outputs a correction value for correcting the value of the lateral acceleration in the direction of increasing the estimated roll angle, to the roll angle estimator 15 (step S107).

On the other hand, in the determination in the step S106, if it is determined that the DR azimuth change amount is greater than the GPS azimuth change amount (the step S106: No), the lateral acceleration zero point corrector 16 corrects the zero point of the lateral acceleration sensor 24 in accordance with a difference between the DR azimuth change amount and the GPS azimuth change amount, in a direction of reducing the estimated roll angle; namely, the lateral acceleration zero point corrector 16 outputs the correction value for correcting the value of the lateral acceleration in the direction of reducing the estimated roll angle, to the roll angle estimator 15 (step S108).

After a lapse of a predetermined time from the end of the step S107 or the step S108, the lateral acceleration zero point corrector 16 performs the step S101. The zero point of the lateral acceleration sensor 24 varies with time due to e.g. environmental temperature or the like. Thus, roll angle estimation accuracy can be improved or maintained by repeating the error correction process.

In the determination in the step S101 and the step S104, if the yaw rate is "equal to" the threshold value, it may be treated as either "being lees than" or "being greater than" the threshold value. In the same manner, in the determination in the step S106, if the DR azimuth change amount is "equal to" the GPS azimuth change amount, it may be treated as either "being less than" or "being greater than" the GPS azimuth change amount. Alternatively, the step S107 or the step S108 may not be performed.

(Technical Effect)

In the embodiment, the DR azimuth change amount, which is remarkably influenced by an error in the estimation of the roll angle (i.e. an error in the lateral acceleration sensor 24), is compared with the GPS azimuth change amount, by which the zero point of the lateral acceleration sensor 24 is corrected. In other words, the lateral acceleration measured by the lateral acceleration sensor 24 is corrected. Therefore, according to the embodiment, the error in the lateral acceleration sensor 24 can be appropriately corrected.

The "GPS receiver 22" and the "Doppler velocity estimator 18" according to the embodiment are respectively one example of the "acquire" and the "velocity estimator" according to embodiments of the present disclosure. The "lateral acceleration zero point corrector 16" according to the embodiment is one example of the "converter" and the "corrector" according to embodiments of the present disclosure.

In the aforementioned embodiment, the GPS satellite is exemplified as the "information transmission source" according to embodiments of the present disclosure. In addition to or instead of the GPS satellite, for example, a pseudo-satellite or pseudolite, a beacon or the like may be used.

First Modified Example

In the aforementioned embodiment, the zero point of the lateral acceleration sensor 24 is corrected on the basis of a result of the comparison between the DR azimuth change amount and the GPS azimuth change amount in one turning period. The zero point of the lateral acceleration sensor 24 may be corrected on the basis of a result of a comparison between an integrated value of the DR azimuth change amount in a plurality of turning periods and an integrated value of the GPS azimuth change amount in a plurality of turning periods. At this time, each of the DR azimuth change amount and the GPS azimuth change amount is integrated in a classification based on positive/negative roll angles.

By virtue of such configuration, even if there is a small influence of the roll angle on the horizontal yaw rate, such as, for example, when the vehicle turns on the road without a cant, it is possible to appropriately correct the error in the lateral acceleration sensor 24. In addition, it is possible to suppress e.g. an influence of noise on the correction of the zero point of the lateral acceleration sensor.

Second Modified Example

Figure 5:
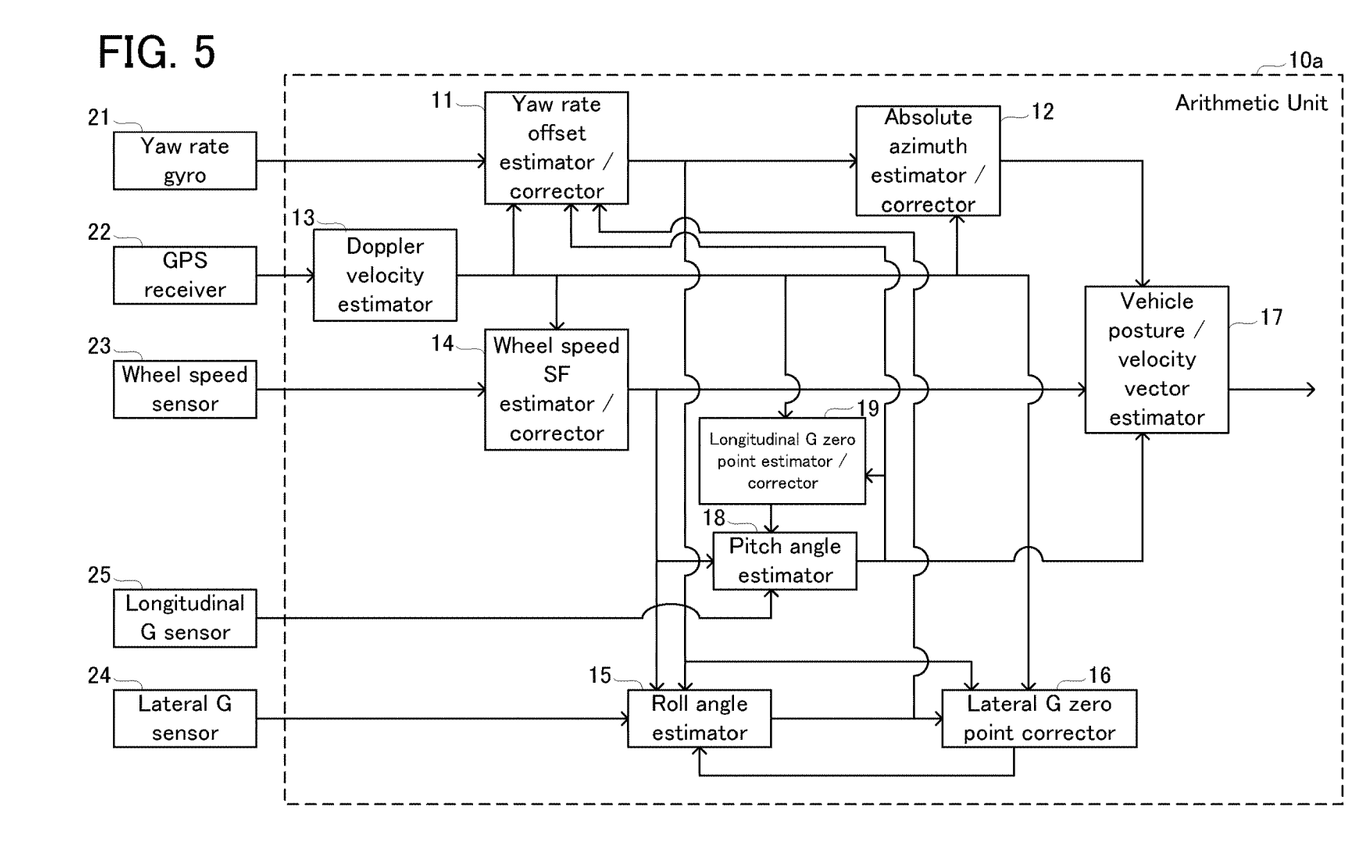
FIG. 5 is a block diagram illustrating a configuration of a sensor error correcting apparatus according to a second modified example.

A sensor error correcting apparatus in a second modified example according to the embodiment will be explained with reference to FIG. 5. FIG. 5 is a block diagram illustrating a configuration of the sensor error correcting apparatus according to the second modified example.

In FIG. 5, a sensor error correcting apparatus 2 is provided with an arithmetic unit 10a, the yaw rats gyro 21, the GPS receiver 22, the wheel speed sensor 23, the lateral acceleration sensor 24, and a longitudinal acceleration sensor 25.

In the second modified example, a pitch angle of the host vehicle is estimated on the basis of an output signal from the longitudinal acceleration sensor 25. Here, if the pitch angle "θ", the wheel speed is "V", longitudinal acceleration "Gx", and the gravity acceleration is "g", then the pitch angle "θ" is given by "g sin θ=Gx−dV(t)/dt".

The correction of the zero point of the lateral acceleration sensor 24 according to the second modified example is the same as the aforementioned embodiment, and thus, an explanation thereof will be omitted. The aforementioned error correction process can be also applied to the sensor error correcting apparatus 2.

The arithmetic unit 10a includes a pitch angle estimator 18 and a longitudinal acceleration zero point estimator/corrector 19, as processing blocks logically realized therein or processing circuits physical realized therein, in order to estimate the pitch angle.

The pitch angle estimator 18 is configured to estimate the pitch angle of the host vehicle, on the basis of the output signal from the longitudinal acceleration sensor 25, the yaw rate corrected by the yaw rate offset estimator/corrector 11, and the wheel speed corrected by the wheel speed scale factor estimator/corrector 14.

The longitudinal acceleration zero point estimator/corrector 19 is configured to compare the pitch angle estimated by the pitch angle estimator 18 with a pitch angle based on the velocity vector estimated by the Doppler velocity estimator 13, thereby correcting a zero point of the longitudinal acceleration sensor 25. Existing techniques/technologies can be applied to a method of correcting the zero point of the longitudinal acceleration sensor 25, and the method is not the purpose of the present disclosure. An explanation of the details of the method will be thus omitted.

The yaw rate offset estimator/corrector 11 is configured to obtain the horizontal yaw rate, on the basis of the corrected yaw rate, the roll angle estimated by the roll angle estimator 15, and the pitch angle estimated by the pitch angle estimator 18. The yaw rate offset estimator/corrector 11 is also configured to output the obtained horizontal yaw rate to the absolute azimuth estimator/corrector 12.

The vehicle posture/velocity vector estimator 17 is configured to estimate the vehicle posture/velocity vector of the host vehicle, i.e. the absolute azimuth and the vehicle speed of the host vehicle, on the basis of the absolute azimuth corrected by the absolute azimuth estimator/corrector 12 and the wheel speed corrected by the wheel speed scale factor estimator/corrector 14. The vehicle posture/velocity vector estimator 17 is further configured to estimate three-dimensional behavior of the host vehicle from the pitch angle estimated by the pitch angle estimator 18 and from the aforementioned vehicle posture/velocity vector.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come within the meaning and range of equivalency of the claims are therefore intended to be embraced therein.

What is claimed is:

1. A sensor error correcting apparatus comprising:
a yaw rate gyro configured to measure a yaw rate of a moving body;
a wheel speed sensor configured to measure a wheel speed of the moving body;
a lateral acceleration sensor configured to measure lateral acceleration of the moving body;
a GPS receiver configured to obtain (i) information about a position of each of information transmission sources, (ii) information about a distance between each of the information transmission sources and the moving body, and (iii) transmission source information including information about a relative speed of the moving body to each of the information transmission sources, on the basis of a signal transmitted from each of the information transmission sources;
a velocity estimator circuit configured to estimate a velocity vector of the moving body on the basis of the obtained transmission source information;
a roll angle estimator circuit configured to estimate a roll angle of the moving body on the basis of the measured yaw rate, the measured wheel speed, and the measured lateral acceleration; and
a converter circuit configured to convert the measured yaw rate to a horizontal yaw rate, on the basis of the estimated roll angle; and
a corrector circuit configured to compare an azimuth change amount obtained by integrating the horizontal yaw rate in a turning period, which is from a start of turning of the moving body to an end of the turning, with an azimuth change amount of the velocity vector in the turning period, and the corrector circuit corrects the measured lateral acceleration.

2. The sensor error correcting apparatus according to claim 1, wherein the corrector circuit is configured to compare an azimuth change amount obtained by integrating the horizontal yaw rate in a plurality of turning periods, with an azimuth change amount of the velocity vector in the plurality of turning periods, and configured to correct the measured lateral acceleration.

3. A sensor error correcting method in a sensor error correcting apparatus including: a yaw rate gyro configured to measure a yaw rate of a moving body; a wheel speed sensor configured to measure a wheel speed of the moving body; a lateral acceleration sensor configured to measure lateral acceleration of the moving body; and a GPS receiver configured to obtain (i) information about a position of each of information transmission sources, (ii) information about a distance between each of the information transmission sources and the moving body, and (iii) transmission source information including information about a relative speed of the moving body to each of the information transmission sources, on the basis of a signal transmitted from each of the information transmission sources, said sensor error correcting method comprising:
estimating a velocity vector of the moving body on the basis of the obtained transmission source information;

estimating a roll angle of the moving body on the basis of the measured yaw rate, the measured wheel speed, and the measured lateral acceleration;

converting the measured yaw rate to a horizontal yaw rate, on the basis of the estimated roll angle; and comparing an azimuth change amount obtained by integrating the horizontal yaw rate in a turning period, which is from a start of turning of the moving body to an end of the turning, with an azimuth change amount of the velocity vector in the turning period, and correcting the measured lateral acceleration.

4. A sensor error correcting apparatus comprising:

a velocity estimator circuit configured to estimate a velocity vector of a moving body on the basis of (i) information about a position of each of information transmission sources, (ii) information about a distance between each of the information transmission sources and the moving body, and (iii) transmission source information including information about a relative speed of the moving body to each of the information transmission sources, which are obtained from a signal transmitted from each of the information transmission sources;

a roll angle estimator circuit configured to estimate a roll angle of the moving body on the basis of a yaw rate of the moving body, a wheel speed of the moving body, and lateral acceleration of the moving body;

a converter circuit configured to convert the yaw rate to a horizontal yaw rate, on the basis of the estimated roll angle; and a corrector circuit configured to compare an azimuth change amount obtained by integrating the horizontal yaw rate in a turning period, which is from a start of turning of the moving body to an end of the turning, with an azimuth change amount of the velocity vector in the turning period, and the corrector circuit corrects the measured lateral acceleration.

5. The sensor error correcting apparatus according to claim 1, wherein the corrector circuit corrects the measured lateral acceleration in a direction of increasing the estimated roll angle when the azimuth change amount obtained by integrating the horizontal yaw rate is less than the azimuth change amount of the velocity vector.

6. The sensor error correcting method according to claim 3, wherein the measured lateral acceleration is corrected in a direction of increasing the estimated roll angle when the azimuth change amount obtained by integrating the horizontal yaw rate is less than the azimuth change amount of the velocity vector.

7. The sensor error correcting apparatus according to claim 4, wherein the corrector circuit corrects the measured lateral acceleration in a direction of increasing the estimated roll angle when the azimuth change amount obtained by integrating the horizontal yaw rate is less than the azimuth change amount of the velocity vector.

* * * * *

UNITED STATES PATENT AND TRADEMARK OFFICE
CERTIFICATE OF CORRECTION

PATENT NO. : 10,295,366 B2
APPLICATION NO. : 15/812487
DATED : May 21, 2019
INVENTOR(S) : Noriyoshi Suzuki Page 1 of 3

It is certified that error appears in the above-identified patent and that said Letters Patent is hereby corrected as shown below:

In the Drawings

Replace sheet 4 of 4 with the attached sheet 4.

In the Specification

In Column 1, Line 35, delete "06678071" and insert --05673071--, therefor.

In Column 5, Line 23, delete "Doppler velocity estimator 18" and insert --Doppler velocity estimator 13--, therefor.

In Column 5, Line 45 & 46, delete "Doppler velocity estimator 18" and insert --Doppler velocity estimator 13--, therefor.

In Column 5, Line 47, delete "Doppler velocity estimator 18" and insert --Doppler velocity estimator 13--, therefor.

In Column 6, Line 39, delete "roll angle estimator 16" and insert --roll angle estimator 15--, therefor.

In Column 7, Line 53, delete "cent" and insert --cant--, therefor.

In Column 8, Line 16, delete "wheel speed sensor 28" and insert --wheel speed sensor 23--, therefor.

In Column 8, Line 36, delete "FIG. 8" and insert --FIG. 3--, therefor.

In Column 8, Line 63, delete "Doppler velocity estimator 18" and insert --Doppler velocity estimator 13--, therefor.

In Column 9, Line 29, delete "Doppler velocity estimator 18" and insert --Doppler velocity estimator 13--, therefor.

Signed and Sealed this
Twenty-third Day of July, 2019

Andrei Iancu
*Director of the United States Patent and Trademark Office*

In Column 10, Line 17, delete ““being lees than”” and insert --“being less than”--, therefor.

In Column 10, Line 36, delete "Doppler velocity estimator 18" and insert --Doppler velocity estimator 13--, therefor.

In Column 10, Line 37, delete "acquire" and insert --acquirer--, therefor.